United States Patent [19]

Faris

[11] 4,373,695

[45] * Feb. 15, 1983

[54] APPARATUS FOR SUSPENDING A PLANTER

[76] Inventor: Bernard L. Faris, R.F.D. 1, Box 166, Glen Allen, Va. 23060

[*] Notice: The portion of the term of this patent subsequent to Feb. 19, 1997, has been disclaimed.

[21] Appl. No.: 158,421

[22] Filed: Jun. 11, 1980

[51] Int. Cl.³ .................................... F16M 13/00
[52] U.S. Cl. .............................. 248/318; 248/323; 211/115; 47/67
[58] Field of Search .............. 248/318, 323, 324, 418, 248/417; 211/115; 47/67

[56] References Cited

U.S. PATENT DOCUMENTS

| | | | |
|---|---|---|---|
| 3,957,242 | 5/1976 | Holtz | 248/318 |
| 4,117,630 | 10/1978 | Kalas | 248/318 |
| 4,189,124 | 2/1980 | Faris | 248/318 |

Primary Examiner—Francis K. Zugel
Attorney, Agent, or Firm—Norman B. Rainer

[57] ABSTRACT

An apparatus is provided which facilitates the controlled rotative positioning of a suspended planter. The apparatus is comprised of a cylindrical outer member and an internal member in sliding engagement with said outer member and coaxially positioned therewith. The internal member is provided with two spaced arrays of teeth so arranged that, when one member is upwardly displaced with respect to the other member, bearing means associated with said outer member induce rotative motion of one of said members. Restoring means acting between said members causes said upward displacement when downward force is removed therefrom. Attachment means associated with each member facilitates suspension of the apparatus from an overhead support and suspension of a planter from that member which undergoes rotative motion.

10 Claims, 6 Drawing Figures

APPARATUS FOR SUSPENDING A PLANTER

BACKGROUND OF THE INVENTION

1. Field of the Invention

This invention relates to apparatus adapted to facilitate the controlled rotative movement of an object suspended by supple tether means, and more particularly to the controlled rotation of a suspended house plant about its vertical axis.

2. Description of the Prior Art

In many instances it is desired to hang an object from a ceiling while also enabling the object to be rotatable in a horizontal plane. This is particularly important when suspending living plants from a ceiling. In such instances it is desirable to rotate the plant in order to successively expose all portions of the plant to light such as natural daylight coming in from a window, thereby promoting symmetrical growth of the plant.

Indoor plants rooted in suitable containers known as planters are frequently suspended from the ceiling of a room of a house by means of hook and eye arrangements adjacent the ceiling. Flexible tether means such as ropes, chains, wires, ribbons or the like depend from the hook and eye combination to support the planter. When it is desired to change the position of the planter, the hook must be disengaged from the eye and re-engaged in the opposite, 180° position. This is not an easily accomplished task because the planter may be of considerable weight, and the transaction must be accomplished with the aid of a step stool, chair, ladder or other means providing sufficient elevation to reach the ceiling. Such manner of suspending a planter also provides only two positional configurations.

Several expedients have been disclosed in the art for coping with the aforementioned difficulty. For example, manually rotable devices which attach to the ceiling and support a hanging planter have been described in U.S. Pat. Nos. 3,957,242 and 3,985,327 to Holz. Such devices, although obviating the need to disconnect the planter, are difficult to rotate unless physically grasped, and therefore do not obviate the need for climbing means to reach the ceiling. If one were to merely turn the planter, causing twisting of the tether lines and consequent transmission of torque to the rotatable device of Holz, the resultant amount of rotation would be difficult to control, and damage may be caused to the plant or tether lines. A further potential shortcoming of the Holz device is that, from one occasion of rotation to the next, the user may forget in which direction the planter should be rotated for even exposure to daylight.

The apparatus of U.S. Pat. No. 4,117,630 to Kalas overcomes the need to grasp a ceiling-mounted fixture by employing a clock motor to continuously rotate a planter unidirectionally. The Kalas device is however of complex construction and does not readily provide for manual override of the clock cycle to compensate for variable lighting conditions. It further necessitates the use of a hanging weight and pull-ring which may detract from the appearance of the planter, and requires that the user reach the pull-ring which may be located considerably closer to the ceiling than the planter.

An apparatus for controllably rotating a suspended planter is disclosed in U.S. Pat. No. 4,189,124 to Faris wherein rotation is achieved when the planter is momentarily pushed upward, and then released; said apparatus being comprised of two facing toothed members, a pull rod having an associated bearing pin disposed between said toothed members, and position-restoring means acting upon said pull rod. Although the aforementioned apparatus of Faris performs effectively, improvements in the strength and ease of manufacture would provide worthwhile enhancement of the practical value of the apparatus.

It is accordingly an object of the present invention to provide apparatus for suspending a planter from an overhead support in a manner which will permit controllable unidirectional rotation of said planter without disengagement from said apparatus and without requiring the user to reach above said planter.

It is a further object of this invention to provide an apparatus of the aforementioned nature comprised of two interactive toothed members and having a construction which affords improved structural strength and ease of fabrication.

These objects and other objects and advantages of the invention will be apparent from the following description.

SUMMARY OF THE INVENTION

The above and other beneficial objects and advantages are accomplished in accordance with the present invention by the provision of an apparatus comprising an outer member having a circular cylindrical configuration, an internal member slideably housed in close-fitting engagement within said outer member and adapted for linear movement along the vertical center axis of said outer member, and position restoring means interactively engaging said members in a manner such that one of said members is caused to rise when no significant downward force is applied thereto. Each member is provided with attachment means for suspending an object from an overhead support.

The internal member is comprised of a shaft coaxially disposed with said center axis and spaced upper and lower circular arrays of teeth, said arrays being coaxially and immoveably secured to said shaft and possessing a number of uniformly spaced vertically disposed teeth in a sawtooth configuration. Each tooth has a vertical edge parallel to said center axis and a contiguous angled edge meeting with said vertical edge as an apex at the outermost reach of said tooth and meeting with the next adjacent vertical edge to form a substantially V-shaped bight at the base of said teeth. The direction of the angled edges of the teeth of one array is opposite to the direction of the angled edges of the teeth of the opposed array. The arrays are further aligned such that the vertical edges of the teeth of one array are opposite the angled edges of the teeth of the opposed array and the apexes of the teeth of one array are upwardly directed while the apexes of the teeth of the other array are downwardly directed.

The outer member possesses bearing means adapted to interact with said teeth and capable of supporting said internal member, said bearing means preferably comprising one or more rigid protrusions directed inwardly from said outer member toward the axis thereof.

The operation of the apparatus is such that one of said members rises when downward force is removed therefrom, causing said bearing means to engage the angled edges of the teeth of a first-contacted array and traverse said edges while rotating said shaft until stopping at bights in said array. When downward force is restored to said risen member, it descends and causes said bearing means to engage the angled edges of the teeth of the opposed, second-contacted array and traverse said edges while rotating said shaft until stopping at bights in said second-contacted array.

In preferred embodiments of the apparatus, the bearing means will be associated with the inside wall of the outer member as paired protrusions directed toward said center axis on a line which perpendicularly intersects said axis. The upper and lower arrays are preferably of equal diameter, and preferably possess an equal, even number of teeth. The position restoring means may be a coil spring device interacting in a manner to either draw the members together or push them apart along said center axis

BRIEF DESCRIPTION OF THE DRAWINGS

In the accompanying drawing forming a part of this specification and in which similar numerals of reference indicate corresponding parts in all the figures of the drawing.

DESCRIPTION OF THE PREFERRED EMBODIMENTS

Figure 1:
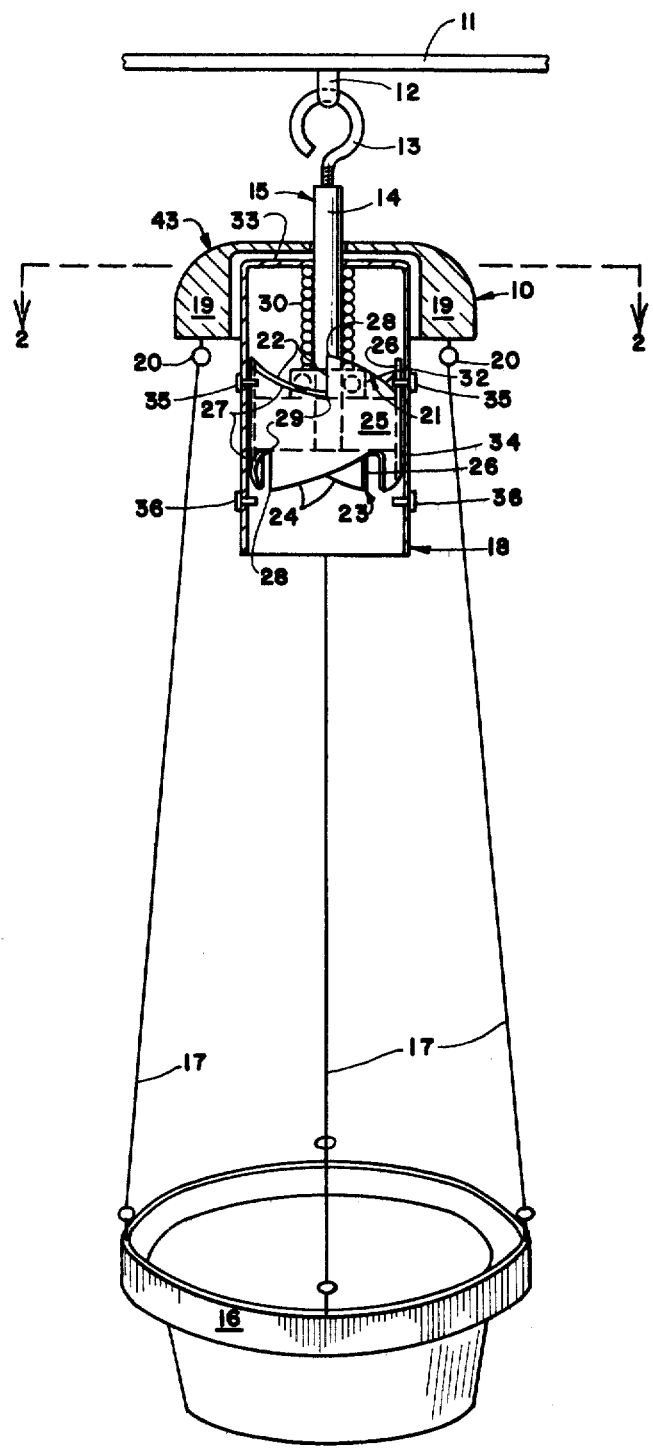
FIG. 1 is a vertical sectional view of an embodiment of the apparatus of the present invention attached to a ceiling and utilized to suspend a planter shown in reduced relative size.
Figure 2:
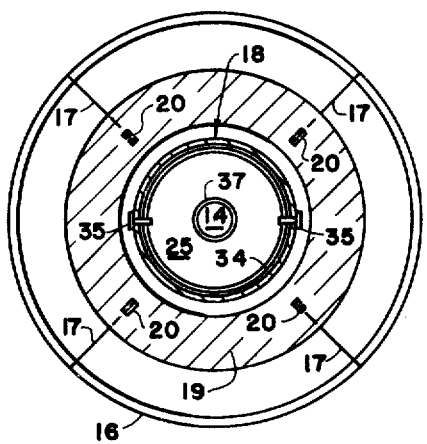
FIG. 2 is a horizontal sectional view taken along the line 2—2 of FIG. 1.
Figure 3:
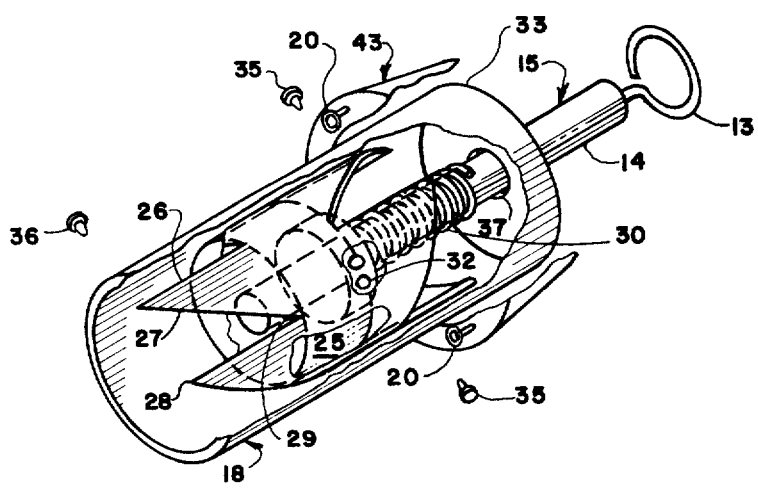
FIG. 3 is an exploded perspective view of the embodiment of apparatus of FIG. 1, with parts broken away to show interior detail.

Referring to FIGS. 1, 2 and 3, an apparatus 10 of the present invention is suspended from a hook 12 in ceiling 11 by engagement with upper attachment means in the form of eye 13 connected to the uppermost terminus of shaft 14 of internal member 15.

A planter 16 is suspended by tether lines 17 connected to lower attachment means 43 comprised of peripherally spaced eyes 20 attached to collar 19 fixedly mounted atop circular cylindrical outer member 18 whose center axis coincides with the center axis of shaft 14.

Internal member 15 is further comprised of a circular cylindrical sleeve 34 which fits closely within outer member 18, the upper and lower extremities of said sleeve having portions cut away so as to provide an upper array 21 of teeth 22 and a lower array 23 of teeth 24. Said sleeve 34 is fixedly joined to shaft 14 in coaxial alignment therewith by spanning means in the form of collar 25 which fills the space between said shaft and the inside surface of sleeve 34.

Said teeth are vertically disposed in a sawtooth configuration. Each tooth has a vertical edge 26 parallel to said center axis and a contiguous angled edge 27 meeting with said vertical edge as an apex 28 at the outermost reach of said tooth and meeting with the next adjacent vertical edge within said array to form a substantially V-shaped bight 29 at the base of said teeth. The direction of the angled edges of the teeth of upper array 21 is opposite to the direction of the angled edges of the teeth of lower array 23. The two arrays are further aligned such that the vertical edges of the teeth of one array are opposite the angled edges of the teeth of the opposed array, and the apexes of the teeth of the upper array are upwardly directed while the apexes of the teeth of the lower array are downwardly directed. The locus of apexes of the teeth of either array defines a circle in a plane perpendicular to said axis.

A coil spring 30 is positioned on shaft 14. The upper end of said spring bears against transverse support means in the form of upper closure 33 of outer member 18. The lower end of spring 30 bears against a circular brace of horizontally rotative ball bearings 32 lying in abutment with collar 25. Said horizontally rotative bearings function as a thrust bearing and serve as torque-reducing means to prevent the rotation of one member by another via frictional engagement with spring 30 or alternative embodiment of restoring means. Said upper closure 33 is further provided with a centered aperture 37 shown more clearly in FIG. 3, through which shaft 14 passes.

Outer member 18 possesses upper bearing means in the form of paired rivets 35 and lower bearing means in the form of paired opposed rivets 36. Said bearing means 35 and 36 are substantially identical. Alternative to the use of rivets, screw-like or equivalent members may be attached to the wall of said outer member or projections integral with said outer member may be provided, as may be derived by a molding operation. The paired rivets 35 and 36 are in diametrically opposed disposition on a line that perpendicularly intersects said axis. The bearing means are adapted to interact with said teeth in a manner to be described hereinafter. Lower bearing means 36 are preferably of a nature which facilitates their installation into said outer member after the insertion therein of the internal member in the course of assembling the apparatus of FIG. 1. Said upper bearing means must also possess sufficient strength to support the weight of planter 16.

In operation, the apparatus of this invention is suspended from an overhead support such as a ceiling by attachment means associated with either said internal or outer member, and is vertically pendant from said support. A planter is in turn supported by said apparatus by tether lines which extend from said planter to attachment means associated with the member alternative to the member involved in suspending the apparatus from an overhead support. In the embodiment of the apparatus illustrated in FIGS. 1, 2 and 3, the attachment means for supending the apparatus from an overhead support is eye 13 associated with internal member 15, and the attachment means for suspending said planter is the peripherally spaced eyes 20 attached to collar 19 which is associated with outer member 18. The specific nature of said attachment means may have still other forms such as apertures in shaft 14 or outer member 18, threaded devices, snap-on fixtures, grooved collars, or equivalent structures. However, in all embodiments, attachment means will be associated with both the internal member and outer member. It is further required, for reasons that will become evident hereinafter, that the attachment means associated with the member suspended from the overhead support be such as to prevent rotative movement of said member. By appropriate selection of attachment means, embodiments of the apparatus of this invention can be utilized in either vertical orientation.

In the embodiment of the apparatus of this invention shown in FIGS. 1, 2 and 3, the weight of suspended planter 16 is borne by upper bearing means 35 engaging bights 29 in upper array 21. When it is decided to cause the planter to be rotated, said planter is merely pushed upwardly from underneath so that downward force is removed from said upper bearing means. Such action releases the downward compressive force on spring 30 or equivalent restoring means, causing the outer member to be displaced upwardly with attendant sliding engagement of lower bearing means 36 with angled edges 27 of lower array 23. Said sliding engagement causes rotation of outer member 18 and planter 16 suspended therefrom. Said rotation continues until bearing means 36 encounter bights 29 of lower array 23. When the planter is released, its weight causes recompression of spring 30 with attendant downward travel of outer member 18. In their downward motion, upper bearing means 35 slidingly engage angled edges of upper array 21, causing further rotative movement of outer member 18 in the same direction, said rotation stopping when said upper bearing means come to rest in bights in said upper array adjacent to the bights in which said bearing means resided prior to the planter-rotating operation.

The basic effect of the apparatus of the present invention is to utilize the vertical linear motion of either the outer member or internal member to generate a rotative motion of the member undergoing said linear motion. The degree of turning achieved in each up-and-down motion of the planter is dependent upon the spacing of the bights in the array which supports the weight of the planter. By repeatedly raising and releasing the planter, any desired total amount of unidirectional rotation may be secured. If, for example, each array contains four identical teeth in a sawtooth pattern defining a circular perimeter, a single up-and-down movement cycle of the planter would achieve 90° of rotation in a horizontal plane, in which case a single raising and releasing of the planter should provide adequate daily rotation for most plants.

The diameter of the arrays, and the height of the teeth, measured from apex to bight, are not critical features. However, greater efficiency of operation is achieved when the ratio of the outside diameter of the array to the height of the teeth is between 1 and 4. It is further preferred that the acute angle of the angled edges of the teeth relative to a horizontal plane be between 20° and 70°, and more preferably between 30° and 60°. Such preferred angles of the angled edges provide more positive translational interaction with said bearing means and cause a favorable fraction of vertically directed force to be horizontally directed as a vector component force. Preferred embodiments of arrays will have four equally dimensioned teeth symmetrically disposed in a circular periphery about said axis. However, embodiments having a greater number of teeth may be employed. An even number of teeth is preferred so that the bearing means can be arranged in diametric opposition, thereby simplifying fabrication. The apexes of said teeth, shown to be pointed, may be rounded in certain embodiments.

Coil spring 30 may be replaced by alternative restoring means utilizing resilient materials, counterbalancing weights, pneumatic or hydraulic cylinders, or other equivalent means to achieve the desired effect of causing one member to rise when downward force is removed therefrom. When a coil spring is utilized as the restoring means, it may be disposed to interact between said outer and inside members so as to cause the raising of a member by either expansion or contraction of said spring.

Figure 4:
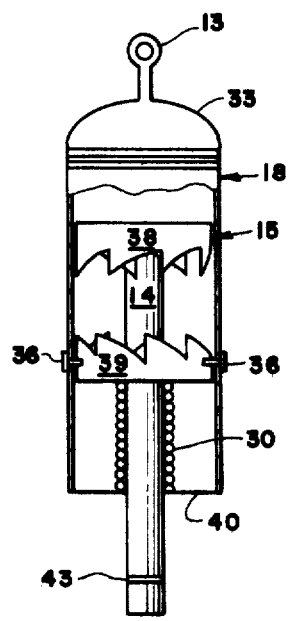
FIG. 4 is a vertical view, partially in section, of an alternative embodiment of the apparatus of the present invention.

In the embodiment of the apparatus of this invention illustrated in FIG. 4, outer member 18 is held in stationary position by engagement of upper attachment means 13 with an overhead support, said upper attachment means being part of upper end closure 33 threadably affixed to outer member 18. Internal member 15 is an integral molded unit comprised of shaft 14, upper toothed portion 38 and lower toothed portion 39, each in the form of cylindric structures emanating from said shaft and having arrays of teeth fashioned in their peripheries. The portions of said cylindric structures extending between the shaft and peripheral arrays of teeth may be considered spanning means equivalent to collar 25 of FIGS. 1, 2 and 3. A single pair of opposed bearing means 36 provides basis for the operational movement of said internal member and support for a planter which may be suspended from lower attachment means 13 having the form of a hole which pierces said shaft. Coil spring 30 disposed on shaft 14 abuts upwardly against the spanning means of lower toothed portion 39, and downwardly against transverse support means having the form of lower end closure 40 of outer member 18.

It is to be further noted that the directions of the apexes of the upper and lower arrays are reversed with respect to the directions of said apexes in the embodiment of FIGS. 1, 2 and 3.

Figure 5:
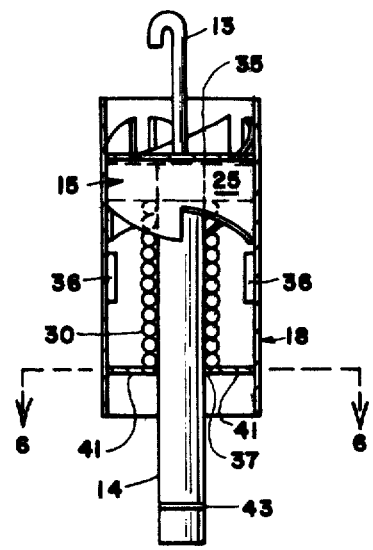
FIG. 5 is a vertical sectional view of another alternative embodiment of the apparatus of this invention.
Figure 6:
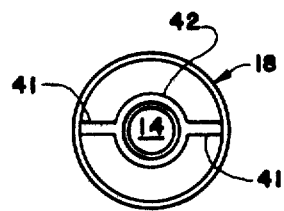
FIG. 6 is a sectional view taken on the line 6—6 of FIG. 5.

The embodiment of the apparatus illustrated in FIG. 5 further exemplifies a moveable internal member 15 in association with a fixed outer member 18. Said outer member is provided with a lower pair of bearing means 36 having the form of vertically disposed inwardly protruding vanes and upper bearing means in the form of horizontally disposed rod 35 whose ends engage the walls of outer member 18 by a bayonet locking mechanism, not shown. Upper attachment means 13 is in the form of a hook, the lower extremity of which is joined to the center of rod 35. Lower attachment means 43 is in the form of a hole which penetrates shaft 14. Upper and lower arrays are fashioned from a piece of circular cylindrical tubing dimensioned to fit closely within outer member 18. A spanning collar 25 joins said cylindrical tubing to shaft 14. The lower extremity of outer member 18 is provided with traverse support means 41 comprised of a flat bar extending across outer member 18 and having a center eye 42, shown in FIG. 6, which serves the dual role of supporting the bottom of spring 30 and guiding shaft 14.

It is noteworthy that, whereas the internal member of the embodiment of FIGS. 1, 2 and 3 is stationary and the outer member is moveable, said relationships are reversed in the embodiments of FIGS. 4 and 5. It is to be further noted that in the embodiment of FIG. 5, the outer member has no closure means at either top or bottom ends.

Although the embodiments of the apparatus exemplified in the drawings involve the use of separate parts in particular modes of assembly, it is apparent that certain structural simplifications may be achieved by standard fabrication methods. For example, internal member 15 may be molded as a single integral monolithic unit comprising a shaft, upper and lower arrays of teeth, and attachment means.

Because of the novel and unusual design of the apparatus of this invention the fabrication of the several component parts and their assembly is simple and therefore economical. The special features of the apparatus also provide the needed reliability of operation and strength to perform safely with long lifetime expectance, and further facilitate styling variations within the purview of the same basic functional concepts of the invention.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An apparatus to be pendantly supported from an overhead support for rotatively suspending an object therebelow comprising an outer member having a circular cylindrical configuration, an internal member slideably housed within said outer member and adapted for linear movement relative to said outer member along the vertical center axis thereof, and position restoring means interactively engaging said members in a manner such that one of said members is caused to rise when no significant downward force is applied thereto, each member being provided with attachment means for suspending an object from an overhead support, said internal member being comprised of a shaft coaxially disposed with said center axis and opposed spaced upper and lower circular arrays of teeth, said arrays being coaxially and immoveably secured to said shaft and possessing equal numbers of uniformly spaced vertically disposed teeth in a sawtooth configuration, each tooth having a vertical edge parallel to said center axis and a contiguous angled edge meeting with said vertical edge as an apex at the outermost reach of said tooth and meeting with the next adjacent vertical edge to form a substantially V-shaped bight at the base of said teeth, the direction of the angled edges of the teeth of one array being opposite to the direction of the angled edges of the teeth of the opposed array, said arrays being aligned such that the vertical edges of the teeth of one array are opposite the angled edges of the teeth of the opposed array and the apexes of the teeth of one array are upwardly directed while the apexes of the teeth of the other array are downwardly directed, said outer member possessing at least one inwardly directed bearing means adapted to interact with said teeth and capable of supporting said internal member, whereby one member rises when downward force is removed therefrom, causing said bearing means to engage the angled edges of the teeth of one array and traverse said edges while rotating said shaft until stopping at bights in said array, and said risen member descends when downward force is restored thereto, causing said bearing means to engage the angled edges of the teeth of the opposed array and traverse said edges while rotating said shaft until stopping at bights in said opposed array.

2. Apparatus of claim 1 wherein said arrays are bandlike structures, and are immoveably secured to said shaft by spanning means disposed substantially perpendicularly to said center axis.

3. Apparatus of claim 2 wherein said position restoring means is a coil spring.

4. Apparatus of claim 3 wherein said outer member has two opposed ends and transverse support means adjacent one of said ends, said support means being penetrated by said shaft.

5. Apparatus of claim 4 wherein said coil spring extends in abutment between said traverse support means and torque-reducing means in abutment with said spanning means.

6. Apparatus of claim 3 wherein said coil spring is disposed about said shaft.

7. Apparatus of claim 1 containing at least two inwardly directed bearing means in opposed relationship about said shaft and positioned on a line that perpendicularly intersects said axis.

8. Apparatus of claim 1 wherein the apexes of the teeth of the upper array are downwardly directed and the apexes of the teeth of the lower array are upwardly directed, and said bearing means are positioned in the interval between said arrays.

9. Apparatus of claim 1 wherein the apexes of the teeth of the upper array are upwardly directed and the apexes of the teeth of the lower array are downwardly directed, and bearing means are positioned above said upper array and below said lower array.

10. Apparatus of claim 5 wherein said coil spring is compressed when downward force is applied to said apparatus, and said torque-reducing means is a horizontally rotative bearing.

* * * * *